3,388,143
GROWTH REACTION
Russell G. Rose, Ponca City, Okla., assignor to Continental Oil Company, Ponca City, Okla., a corporation of Delaware
No Drawing. Filed Nov. 23, 1964, Ser. No. 413,337
4 Claims. (Cl. 260—448)

ABSTRACT OF THE DISCLOSURE

Formation of polymer during the growth reaction of ethylene onto a low molecular weight alkyl aluminum compound is inhibited by addition of a minor amount of vinyl halide, preferably vinyl chloride.

---

This invention relates to the growth process of reacting ethylene with a low molecular weight aluminum alkyl. In one aspect, the invention relates to a method of reducing formation of polyethylene during a growth process.

The synthesis of trialkylaluminum compounds of varying molecular weights has recently received considerable attention, since these compounds are useful intermediates in the preparation of other organic compounds. For example, they can be oxidized to the corresponding alkoxide which is then readily hydrolyzed to the alcohol. They can be subjected to displacement with an olefin of low molecular weight to produce 1-olefins. One method of synthesizing trialkylaluminum is the so-called "growth" process wherein a low molecular weight trialkylaluminum, such as triethylaluminum or tripropylaluminum, is reacted with an olefin of 2 to about 4 carbon atoms under conditions which effect growth of alkyl chains to a higher molecular weight trialkylaluminum according to the equation (1)
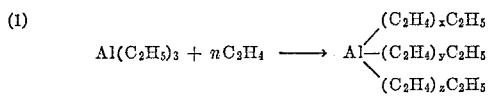

wherein $x$, $y$ and $z$ represent integers ranging from 0 to 14 (average 3–7) and $x+y+z=n$. This growth reaction is described in detail in, for example, U.S. Patent 2,971,969 to Paul A. Lobo, issued Feb. 14, 1961. One major problem in this process is formation of solid polyethylene or other solid olefin polymer during the growth reaction. Whether the growth reaction is operated as a batch or a continuous process, formation of polyethylene results in a loss of ethylene monomer available for growth. Additionally, when the growth reaction is operated on a batch basis, polymer formation necessitates frequent shutdown of the reactor for washing out polymer, and additional ethylene losses because of the need to vent the reactor prior to shut-down.

Accordingly, it is an object of this invention to reduce formation of polymer during the growth reaction. It is another object of this invention to reduce the amount of fouling of reactor surfaces and downstream heat exchanger surfaces in a growth reaction process.

Other aspects, objects and the several advantages of this invention will become apparent upon study of this disclosure and the appended claims.

According to the invention, it has been found that vinyl chloride is an effective inhibitor against formation of polyethylene in the growth reaction. It has also been found that there is a residual inhibiting effect from use of small amounts of vinyl chloride in a batch growth reactor, such that the amount of inhibitor required during subsequent runs in the same equipment is less than that required during the first run.

As stated, the growth reaction can be carried out in either a continuous or a batch manner. In either event, reaction pressure is between about 200 and about 5000 p.s.i.a. and preferably between about 1000 and about 3500 p.s.i.a. Reaction temperature is between about 150 and about 310° F., preferably between about 195 and about 250° F. The growth reaction is usually carried out in a diluent, which can for example be paraffinic, cycloparaffinic or aromatic such as kerosene, isooctane, xylene, cyclohexane, benzene, and the like. The growth olefin is normally ethylene, and the aluminum compound subjected to growth is a low molecular weight alkyl aluminum, such as triethylaluminum, tripropylaluminum, tri-n-butylaluminum or tri-i-butylaluminum.

The amount of vinyl chlorine inhibitor used is from a trace of about 1 weight percent or more based on the low molecular weight trialkylaluminum feed, preferably between about 0.01 and about 1 weight percent on the same basis.

The following examples will serve to more fully illustrate this invention.

Example 1

A solution of about 40 weight percent triethylaluminum in a wash oil was subjected to a series of ten consecutive batch growth reactions under ethylene pressure of 2000 p.s.i.g. at 250° F. with 130 minutes residence time for each batch. During the 10 runs, the total ethylene consumed was 1370 g. The total triethylaluminum charge was 1115.9 g. about evenly distributed in each batch. There was recovered from the reactor impellor 0.45 g. polyethylene, or about 0.03 weight percent of the total ethylene feed.

Example 2

Triethylaluminum from the same feed batch as in Example 1 was subjected to a series of eight consecutive batch growth reactions with the same ethylene pressure, temperature, and residence time per batch as in that example. There was added to each batch 0.01 weight percent vinyl chloride based on triethylaluminum charge. Of the total 1578 g. ethylene consumed during the runs, there was recovered only 0.095 g. polymer, or about 0.006 weight percent of ethylene feed. This shows a 5-fold decrease in amount of polymer formed.

Example 3

Triethylaluminum from a different lot was subjected to growth under 2000 p.s.i.g. ethylene pressure at 250° F. for a series of five consecutive batch growth reactions. A total of 1179 g. ethylene was consumed, and there was recovered 8.23 g. or 0.7 weight percent polymer based on ethylene feed.

Example 4

Triethylaluminum from the same lot as in Example 3 was subjected to a series of five consecutive growth reactions under the same conditions of temperature, pressure and residence time. One weight percent vinyl chloride based on triethylaluminum charge was added to each batch. Of the total 994 g. ethylene consumed, there was recovered only 1.07 g. polymer, or 0.11 weight percent of charge. This shows a 6-fold decrease in polymer formation over Example 3.

Example 5

The autoclave used in Example 2, in which there had been run a series of eight consecutive batch reactions in the presence of 0.01 weight percent vinyl chloride with total polymer production of 0.006 weight percent of charge ethylene, was used after being washed out with solvent for a series of five more consecutive batch growth reactions. No vinyl chloride was added during this second series of five runs. The ethylene pressure and temperature were as in Example 2, and residence time was 115 minutes per batch. After the five runs, there was recovered 0.05 g. polymer of the 729 g. ethylene consumed, or 0.006 weight percent. This indicates a residual inhibiting effect in the equipment. The autoclave was again solvent-washed, and used for five more consecutive batches under the same conditions as in the preceding portion of this example. This time there was recovered 0.10 g. polymer from the 773 g. ethylene consumed, or 0.01 weight percent. This indicates a "wearing out" of the residual effect.

Although vinyl chloride has been exemplified, the other vinyl halides are also effective.

While the invention has been described in terms of certain embodiments thereof, it is to be understood that it is not limited thereto and includes a variety of operating conditions and means useful for carrying out the invention.

What is claimed is:

1. In a growth process in which ethylene is reacted with a low molecular weight alkylaluminum compound in which each alkyl group contains from 2 to about 4 carbons, the improvement which comprises adding a polymerization-inhibiting amount of a vinyl halide.

2. The proces of claim 1 wherein the process is effected batch-wise.

3. The process of claim 2 wherein said alkylaluminum is triethylaluminum.

4. The process of claim 3 wherein said vinyl halide is vinyl chloride and is added in an amount between about 0.01 and 1 weight percent based on said triethylaluminum.

References Cited

UNITED STATES PATENTS 3,251,901  5/1966  Bacskai _____ 260—683.15
3,029,231  4/1962  Van Amerongen.

TOBIAS E. LEVOW, *Primary Examiner.*